UNITED STATES PATENT OFFICE.

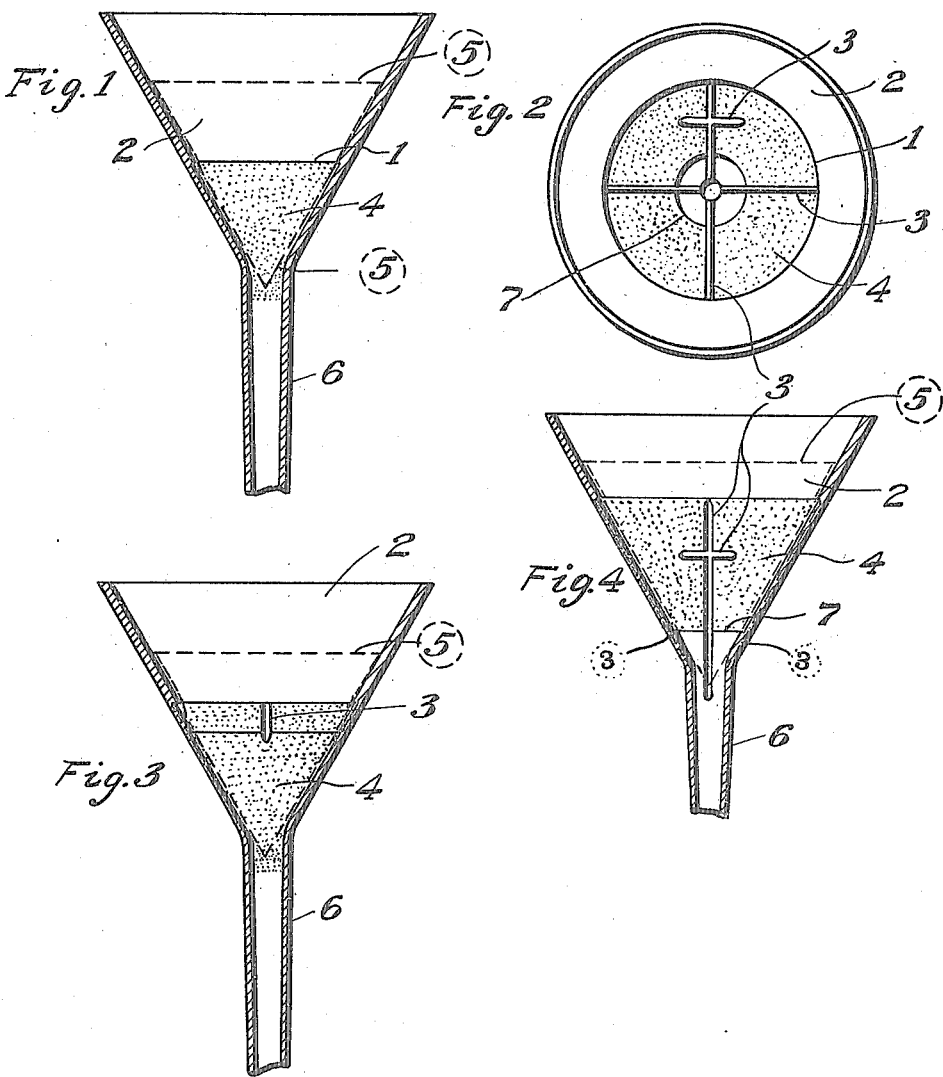

FRANK S. HAWKEN, OF ST. LOUIS, MISSOURI.

FILTER-FUNNEL.

1,257,956.	Specification of Letters Patent.	Patented Feb. 26, 1918.

Application filed April 30, 1917. Serial No. 165,572.

*To all whom it may concern:*

Be it known that I, FRANK S. HAWKEN, a citizen of the United States, and resident of St. Louis, Missouri, have invented certain new and useful Improvements in Filter-Funnels, of which the following is a specification containing a full, clear, and exact description, reference being had to the accompanying drawings, forming a part hereof.

My invention relates to an improved funnel, and consists in the improvements hereinafter described and particularly pointed out in the claim found at the end of this specification.

The object of my invention is, broadly stated, to provide improvements which will increase the capacity of filtering funnels, and enable a funnel of small size to filter much faster than a funnel of like size, but devoid of my improvements.

In the drawings,

Figure 1 is a vertical section of one form of a funnel constructed in accordance with the principle of my invention.

Fig. 2 is a plan view of another form of funnel construction, for carrying out my invention.

Fig. 3 is a vertical section of a third modification, and

Fig. 4 is a vertical section of the funnel shown in Fig. 2.

In carrying out my invention, to increase the capacity of a filtering funnel of given size, I form one or more off-sets, or "steps," 1 upon the interior of the main funnel body 2, at a point some distance below the upper end of said body so that an annular smooth section is left above said off-set; and in some cases I provide drain-grooves, or channels, 3, and numerous small "projections" 4, upon the interior of the funnel at a point below the said off-set or off-sets; whereby the filtering medium (as filter paper, or any other common strainer, shown by dotted lines) 5, will when wet by the liquid being filtered securely adhere to said smooth section, but below said section said paper will be held away from the interior wall of the funnel during the filtering or straining operation, by the said off-sets, or shoulders, or steps, as well as by the said numerous projections, and at the points where said filter paper or other strainer extends across the said channels; thus enabling the liquid being filtered to pass more rapidly through said filtering or straining medium and enter the stem or delivery-tube 6 from various sources, instead of only from that portion of said medium which is located immediately over the upper end of said stem or tube.

In Figs. 2 and 4 I have shown an annular shoulder or projection 7, with the said channels 3 extended across said annular shoulder.

In glass funnels, the off-sets 1, the drain-channels 3 and roughened surface (or "projections") 4, may be made upon the interior of the funnel by etching, or by the sand-blast process, or in any other known way, as by molding the glass to form said parts of the funnel.

In metallic funnels, said parts may be made in any way known to skilled workmen, and the several parts of the funnel may be made of any suitable materials, of any size and proportion.

In glass funnels, the size and general design may be varied to a considerable extent without departing from the spirit of the invention.

In the process of filtering, or straining, with my invention, the filtering paper 5, or other straining-device, is placed in conical form upon the interior of the funnel, as indicated by dotted lines; and then the liquid to be filtered is poured into the filter; and the said off-sets 1, the said channels 3 and the said roughened surface 4, effectively hold the said filtering-medium away from (or out of contact with) the underlying parts of the funnel, and thereby increase to an enormous extent the active filtering-surface of the said medium; thus enabling the liquid to pass more rapidly through the funnel than it would do if my invention was not used. Furthermore, the wet paper 5 will securely adhere to the said smooth section above the said off-set 1 (and, of course, above all of the said channels 3 and projections 4), and form a water and air tight joint with said smooth section, and the air as well as the liquid to be filtered will be prevented from passing between the walls of the said smooth section and the overlying filtering-medium, and a very effective "suction" takes place by the action of the weight of the column of liquid contained in the funnel and in its stem or tube 6, the same acting as a siphon, to draw the said column through the funnel.

In this way the flow is considerably increased, in addition to the increased flow brought about by the above described construction of the said channels 3 and projections 4.

Were it not for the adhesion of the wet paper to the said smooth section the air would be drawn in behind the paper, and thus retard the action of the filter in a great measure.

I claim:

An improved filter-funnel, comprising the main body, in the upper interior wall of which is a smooth section to which the plain smooth filter paper may adhere, an annular shoulder in said main body just below said smooth section, and an irregular wall having grooves and projections located just below the plane of said annular shoulder, but above the plane of the contraction forming the neck of the funnel.

In testimony whereof, I have signed my name to this specification, in presence of two subscribing witnesses.

FRANK S. HAWKEN.

Witnesses:
HENRY L. HIGDON,
JOHN C. HIGDON.

Copies of this patent may be obtained for five cents each, by addressing the "Commissioner of Patents, Washington, D. C."